(12) United States Patent
Wu (10) Patent No.: US 7,852,377 B2
(45) Date of Patent: Dec. 14, 2010

(54) AUTOMATIC RED EYE REMOVAL (75) Inventor: Donghui Wu, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 1295 days.

(21) Appl. No.: 10/826,108

(22) Filed: Apr. 16, 2004

(65) Prior Publication Data

US 2005/0232481 A1  Oct. 20, 2005

(51) Int. Cl.
*H04N 5/228* (2006.01)
*H04N 5/217* (2006.01)

(52) U.S. Cl. .............. 348/222.1; 348/234; 348/241; 382/117; 382/167

(58) Field of Classification Search ........ 348/239, 348/272
See application file for complete search history.

(56) References Cited

U.S. PATENT DOCUMENTS

| | | | | |
|---|---|---|---|---|
| 6,204,858 | B1 * | 3/2001 | Gupta | 345/600 |
| 6,292,574 | B1 * | 9/2001 | Schildkraut et al. | 382/117 |
| 6,407,777 | B1 | 6/2002 | DeLuca | |
| 6,714,665 | B1 * | 3/2004 | Hanna et al. | 382/117 |
| 6,728,401 | B1 * | 4/2004 | Hardeberg | 382/167 |
| 6,895,112 | B2 * | 5/2005 | Chen et al. | 382/167 |
| 7,035,461 | B2 * | 4/2006 | Luo et al. | 382/167 |
| 7,042,505 | B1 * | 5/2006 | DeLuca | 348/241 |
| 7,155,058 | B2 * | 12/2006 | Gaubatz et al. | 382/167 |
| 7,343,028 | B2 * | 3/2008 | Ioffe et al. | 382/118 |
| 7,403,654 | B2 * | 7/2008 | Wu et al. | 382/167 |
| 2002/0176623 | A1 | 11/2002 | Steinberg | |
| 2003/0202105 | A1 * | 10/2003 | Gaubatz et al. | 348/207.99 |
| 2004/0037460 | A1 * | 2/2004 | Luo et al. | 382/165 |
| 2004/0120575 | A1 * | 6/2004 | Cheng | 382/167 |
| 2004/0240747 | A1 * | 12/2004 | Jarman et al. | 382/274 |
| 2005/0047656 | A1 * | 3/2005 | Luo et al. | 382/167 |
| 2005/0196067 | A1 * | 9/2005 | Gallagher et al. | 382/275 |

OTHER PUBLICATIONS

Ming-Hsuan Yang and David J. Kriegman, "Detecting Faces in Images: A Survey," IEEE Trans. on Pattern Analysis and Machine Intelligence, vol. 24, No. 1, Jan. 2002.

Arturo de la Escalera and Miguel Angel Salichs, "Road Traffic Sign Detection and Classification," IEEE Trans. on Industrial Electronics, vol. 44, No. 6, Dec. 1997.

* cited by examiner

*Primary Examiner*—Ngoc-Yen T Vu
(74) *Attorney, Agent, or Firm*—Patent Law Group LLP; David C. Hsia

(57) ABSTRACT

A method for removing a red eye from an image includes (1) calculating a weighted red value for each pixel in the image from red, green, and blue color values and a luminance value of each pixel in the image, (2) selecting a plurality of pixels in the image having weighted red values greater than a threshold as red eye pixels, and (3) correcting some of the red eye pixels to remove the red eye from the image. The weighted red value for a pixel is calculated as follows:

$$f = \frac{c_1 r + c_2 g + c_3 b}{Y},$$

wherein f is the weighted red value, r is the red color value, g is the green color value, b is the blue color value, $c_1$ is a first weight given to the red color value, $c_2$ is a second weigh given to the green color value, $c_3$ is a third weight given to the blue color value, and Y is the luminance.

46 Claims, 6 Drawing Sheets

AUTOMATIC RED EYE REMOVAL

FIELD OF INVENTION

This invention relates to a method for red eye removal in photographs and images.

DESCRIPTION OF RELATED ART

The pupil is an opening that lets light into the eye. Since most of the light entering the eye does not escape, the pupil appears black. In dim light, the pupil expands to allow more light to enter the eye. In bright light, the pupil contracts to allow less light to enter the eye.

"Red eye" is a phenomenon where a person's pupils appear red in a photograph taken with a flash. Red eye comes from light reflecting off of the blood vessels in the retinas (on the back interior of the eyeballs).

Some cameras have a "red eye reduction" feature. In these cameras, the flash goes off twice—once right before the picture is taken, and then again to actually take the picture. The first flash causes people's pupils to contract, thereby reducing red eye significantly.

Some photography software have a "red eye removal" feature. These software require the user to identify the red eye, usually by dragging a rectangular box around the red eye with a mouse, and then remove red eye from the specified area. Others software, such as those available from Pixology of Guildford, England, and FotoNation of San Francisco, Calif., require little or no user intervention and the software identifies the red eye automatically.

In addition, there are literatures that describe methods for red eye removal. Of particular interest is U.S. Patent Application Publication 2002/0176623, filed Mar. 29, 2002 ("Steinberg"). Steinberg describes a 3-step process: (1) search candidate areas by color constraints; (2) eliminate candidates with shape and other criteria; and (3) output the results for user interactive verification of the red eye candidates. However, this process has been widely used and is processing common sense.

For example, in an article by de la Escalera et al., a process for detecting road traffic signs is disclosed. de la Escalera et al., "Road Traffic Sign Detection and Classification," IEEE Trans. on Industrial Electronics, Vol. 44, No. 6, December 1997. de la Escalera et al. discloses two steps: (1) localize the sign in the image depending on the color and the form; and (2) recognize the sign through a neural network.

In another example, in an article by Yang et al., a process for face detection is disclosed. "Detecting Faces in Images; A Survey," Yang et al., IEEE Trans. on Pattern Analysis and Machine Intelligence, Vol. 24, No. 1, January 2002. Yang et al. states, "Most of [software] utilize global features such as skin color, size, and shape to find face candidates, and then verify these candidates using local, detailed features such as eye brows, nose, and hair. A typical approach begins with the detection of skin-like regions . . . . Next, skin-like pixels are grouped together using connected component analysis or clustering algorithms. If the shape of a connected region has an elliptic or oval shape, it becomes a face candidate. Finally, local features are used for verification." Id. at p. 40.

BRIEF DESCRIPTION OF THE DRAWINGS

Use of the same reference numbers in different figures indicates similar or identical elements.

SUMMARY

In one embodiment of the invention, a method for removing a red eye from an image includes (1) calculating a weighted red value for each pixel in the image from red, green, and blue color values and a luminance value of each pixel in the image, (2) selecting a plurality of pixels in the image having weighted red values greater than a threshold as red eye pixels, and (3) correcting some of the red eye pixels to remove the red eye from the image. The weighted red value for a pixel is calculated as follows:

$$f = \frac{c_1 r + c_2 g + c_3 b}{Y},$$

wherein f is the weighted red value, r is the red color value, g is the green color value, b is the blue color value, $c_1$ is a first weight given to the red color value, $c_2$ is a second weigh given to the green color value, $c_3$ is a third weight given to the blue color value, and Y is the luminance.

DETAILED DESCRIPTION

Figure 1:
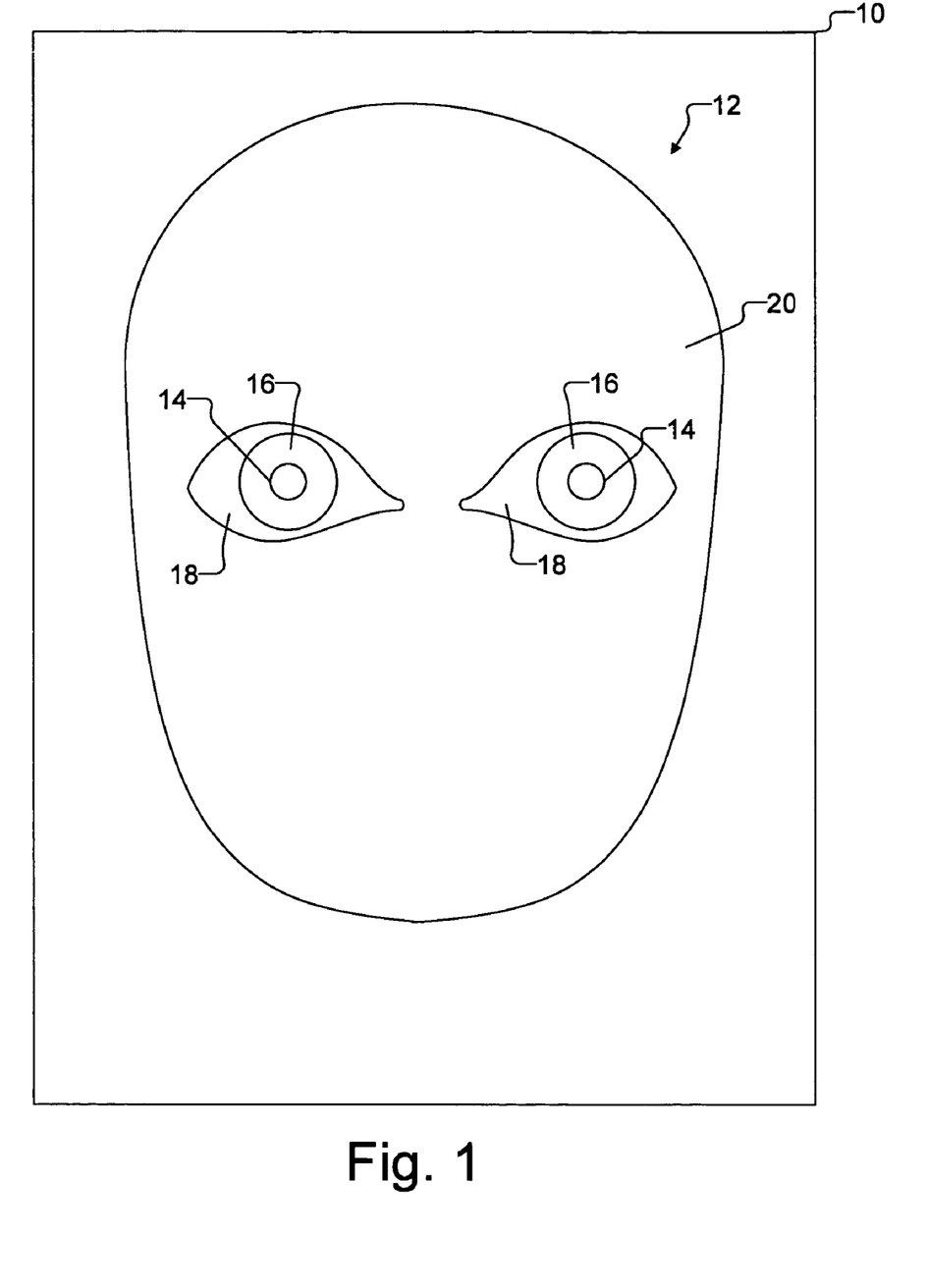
FIG. 1 illustrates an image with red eye in one embodiment of the invention.

FIG. 1 illustrates an image 10 of a person 12 having pupils 14, eyes 16, scleras 18, and face 20 in one embodiment. In a phenomenon called "red eye," pupils 14 appear red when light reflects off of the blood vessels in back interior of the eyeballs. It has been experimentally determined that a red eye typically consists of pixels that are purple-red or orange-red.

Figure 2:
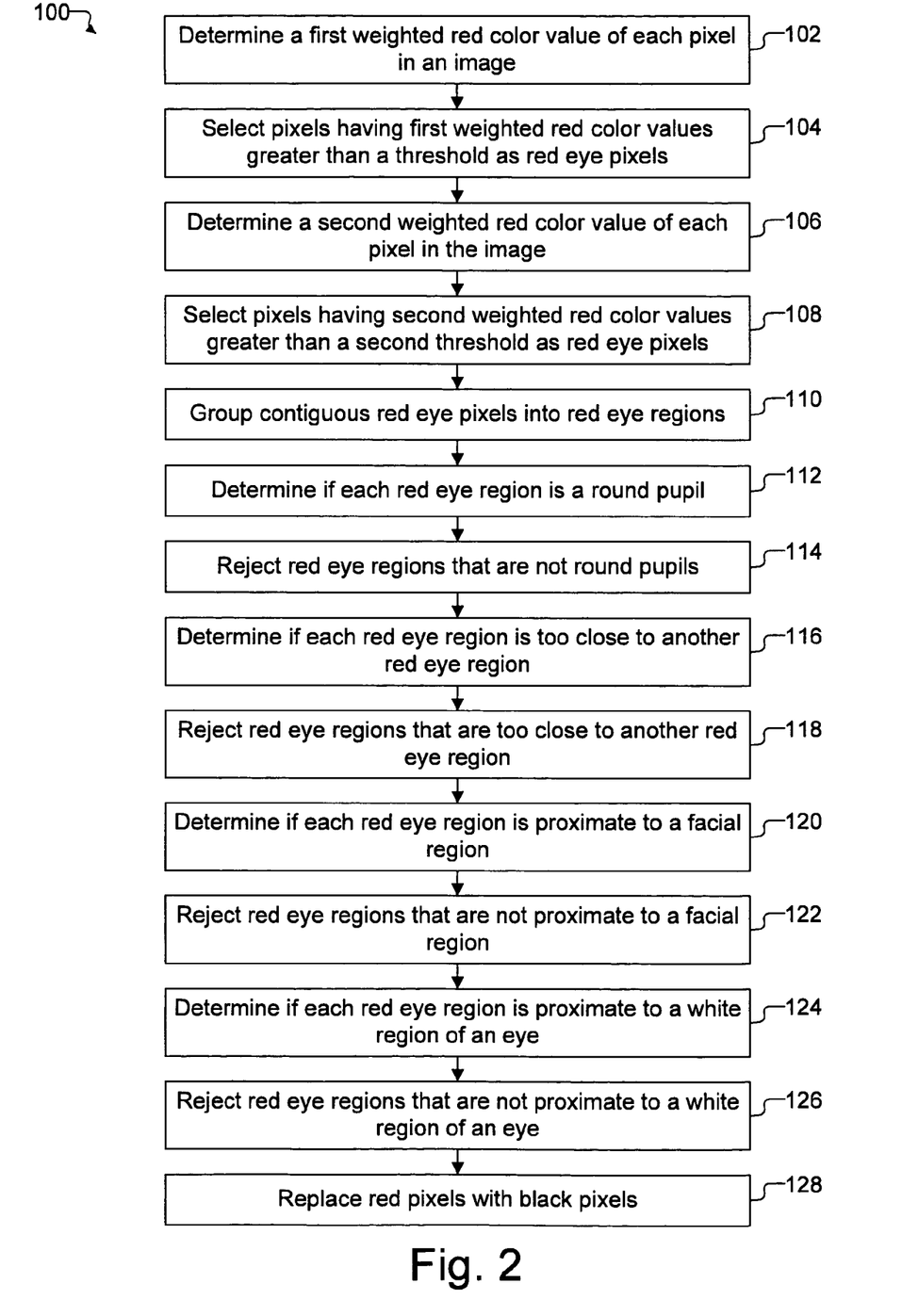
FIG. 2 is a flowchart of a method for red eye removal in one embodiment of the invention.

FIG. 2 illustrates a method 100 to automatically remove red eye from image 10 in one embodiment. Method 100 does not require the user to designate an area from which the red eye is removed. Method 100 involves low computational complexity and may be implemented in software executed by a computer or firmware embedded into digital cameras, printers, scanners, mobile phones.

In step 102, the software determines a weighted purple-red value of each pixel in image 10. The weighted purple-red value represents the likelihood that a pixel is a purple-red pixel that forms part of a red eye. In one embodiment for the rgb (red, green, and blue) color space, the weighted purple-red value of a pixel is determined from its red, green, and blue color values, and its luminance as follows:

$$f_1 = \frac{c_1^{(1)} r + c_2^{(1)} g + c_3^{(1)} b}{Y}, \quad (1)$$

where $f_1$ is the weighted purple-red value, r is the red color value, g is the green color value, b is the blue color value, $c_1^{(1)}$ is a weight given to the red color value, $c_2^{(1)}$ is a weight given to the green color value, $c_3^{(1)}$ is a weight given to the blue color value, and Y is the luminance calculated as $Y=a_1r+a_2g+a_3b$. Note that the weighted red value is independent of luminance change. In one embodiment, $c_1^{(1)}$ is 0.5, $c_2^{(1)}$ is 0.5, $c_3^{(1)}$ is −1, and Y=0.299r+0.587g+0.114b. In other words, equation (1) can be rewritten as:

$$f_1 = \frac{r+b-2g}{2Y}. \quad (2)$$

In one embodiment for the YCrCb (luminance, red chrominance, and blue chrominance) color space, the weighted purple-red value of a pixel is determined as follows:

$$f_1 = \frac{1.41514(Cr-128)+1.23014(Cb-128)}{Y}, \quad (3)$$

where Cr is the red chrominance, Cb is the blue chrominance, and Y is the luminance.

In step 104, the software selects the pixels in image 10 that have weight purple-red values greater than a threshold as redeye pixels. In one embodiment, this threshold is 0.5.

In step 106, the software determines a weighted orange-red value of each pixel in image 10. The weighted orange-red value represents the likelihood that a pixel is an orange-red pixel that forms part of a red eye. In one embodiment for the rgb color space, the weighted orange-red value for a pixel is determined from its red, green, and blue color values as follows:

$$f_2 = \frac{c_1^{(2)}r+c_2^{(2)}g+c_3^{(2)}b}{Y}, \quad (4)$$

where $f_2$ is the second type of weighted red value, $c_1^{(2)}$ is a weight given to the red color value, $c_2^{(2)}$ is a weight given to the green color value, and $c_3^{(2)}$ is a weight given to the blue color value. As noted above, the weighted red value is independent of luminance change. In one embodiment, $c_1^{(2)}$ is 0.6667, $c_2^{(2)}$ is 0.3333, $c_3^{(2)}$ is −1.0. In other words, equation (4) can be rewritten as:

$$f_2 = \frac{2r+g-3b}{3Y}. \quad (5)$$

In one embodiment for the YCrCb color space, the weighted orange-red value of a pixel is determined as follows:

$$f_2 = \frac{0.69662(Cr-128)+1.88671(Cb-128)}{Y}. \quad (6)$$

In step 108, the software selects the pixels in image 10 that have weighted orange-red values greater than another threshold as red eye pixels. In one embodiment, this threshold is 0.5.

Figure 3:
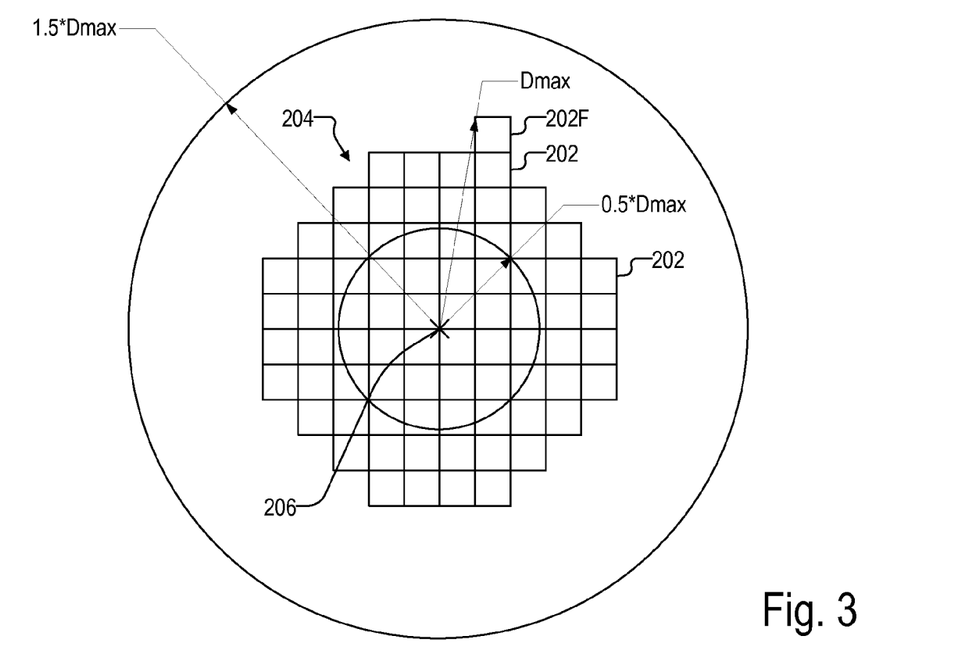
FIGS. 3, 4, and 5 illustrate how a red eye region is determined to be a substantially round pupil with red eye in one embodiment of the invention.

In step 110, the software groups contiguous red eye pixels into red eye regions. Red eye pixels hereafter refer to the purple-red and orange-red pixels selected in steps 104 and 108. A red eye region can contain purple-red pixels, orange-red pixels, or a combination thereof. FIG. 3 illustrates a group of red eye pixels 202 (only a few are labeled) that form a red eye region 204. Although not illustrated, it is understood that other pixels surround red eye pixels 202.

In step 112, the software determines if each red eye region is a substantially round pupil. In step 114, the software rejects the red eye pixels in each red eye region that is not a substantially round pupil. Steps 112 and 114 are illustrated in reference to red eye region 204 in FIGS. 3 and 4 but in actually are repeated for each red eye region.

First, the software determines the geometric center 206 of red eye region 204. The software then determines the distance $D_{max}$ from geometric center 206 to the farthest red eye pixel 202F. Distance $D_{max}$ is used to set a range of radii of circles where the weighted red values of corresponding pixels located on two adjacent circles are compared. This is illustrated in reference to FIG. 4.

Figure 4:
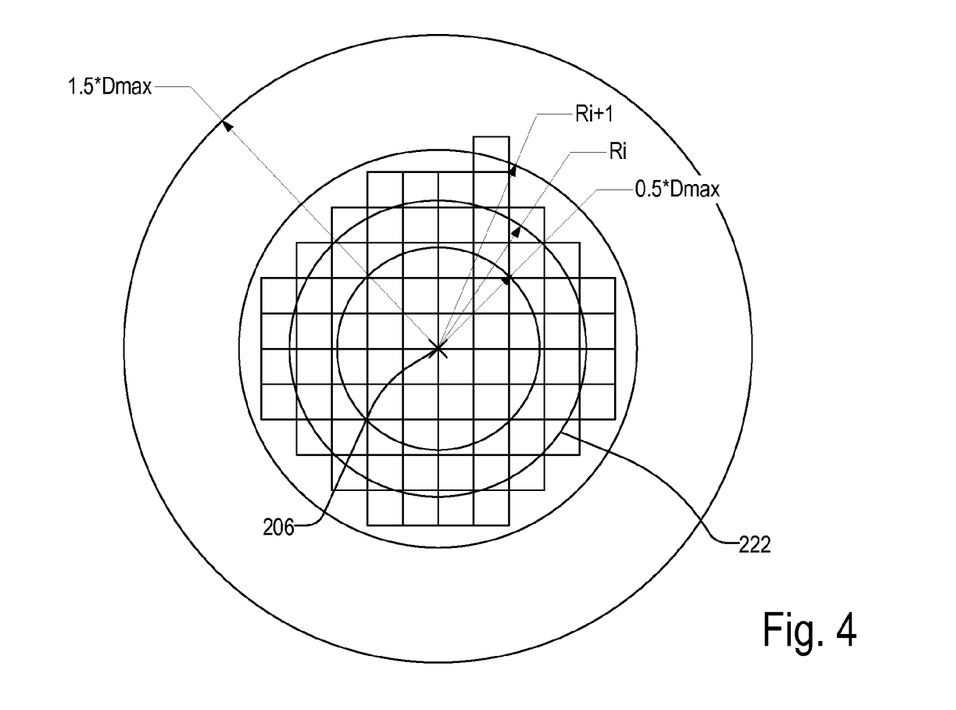

The software first determines the sum of the weighted red values of the pixels located at a first circle having a radius $R_i$ as follows:

$$S(R_i) = \sum_{0 \le \theta < 360} \mathrm{Max}(f_1(R_i, \theta), f_2(R_i, \theta)), \quad (7)$$

where $S(R_i)$ is the sum of the first circle, Max(x,y) is a function that outputs the maximum of inputs x and y, and $R_i$ and $\theta$ are the polar coordinates of a pixel.

The software then determines of the sum of the weight red values of the pixels located at an adjacent second circle having a radius $R_{i+1}$.

$$S(R_{i+1}) = \sum_{0 \le \theta < 360} \mathrm{Max}(f_1(R_{i+1}, \theta), f_2(R_{i+1}, \theta)), \quad (8)$$

where $S(R_{i+1})$ is the sum of the second adjacent circle. In one embodiment, the radius $R_{i+1}$ is radius $R_i$ incremented by 1 pixel, and angles $\theta$ consists 0 to 360° increased at 4° increments (e.g., 0, 4, 8 . . . 356).

The software then determines the difference between the two sums: $S(R_i)-S(R_{i+1})$. If the absolute value of the difference is small, then there has not been a change in the red color between the pixels on the adjacent circles, which indicates that the image has not transitioned from a pupil having red eye to the eye (e.g., from pupil 14 to eye 16). If the difference is positive, then there has been a decrease in the red color between the pixels on the adjacent circles, which may indicate that the image has transitioned from a pupil having red eye to the eye.

In one embodiment, this process is repeated for radii ranging from $0.5*D_{max}$ to $1.5*D_{max}$ where the radius is incremented at 1 pixel between adjacent circles. After the process is completed for these radii, the software selects the radius of the circle that generates the largest difference with its adjacent circle as the radius of a pupil (hereafter "$R_{pupil}$") having red eye region 204.

Figure 5:
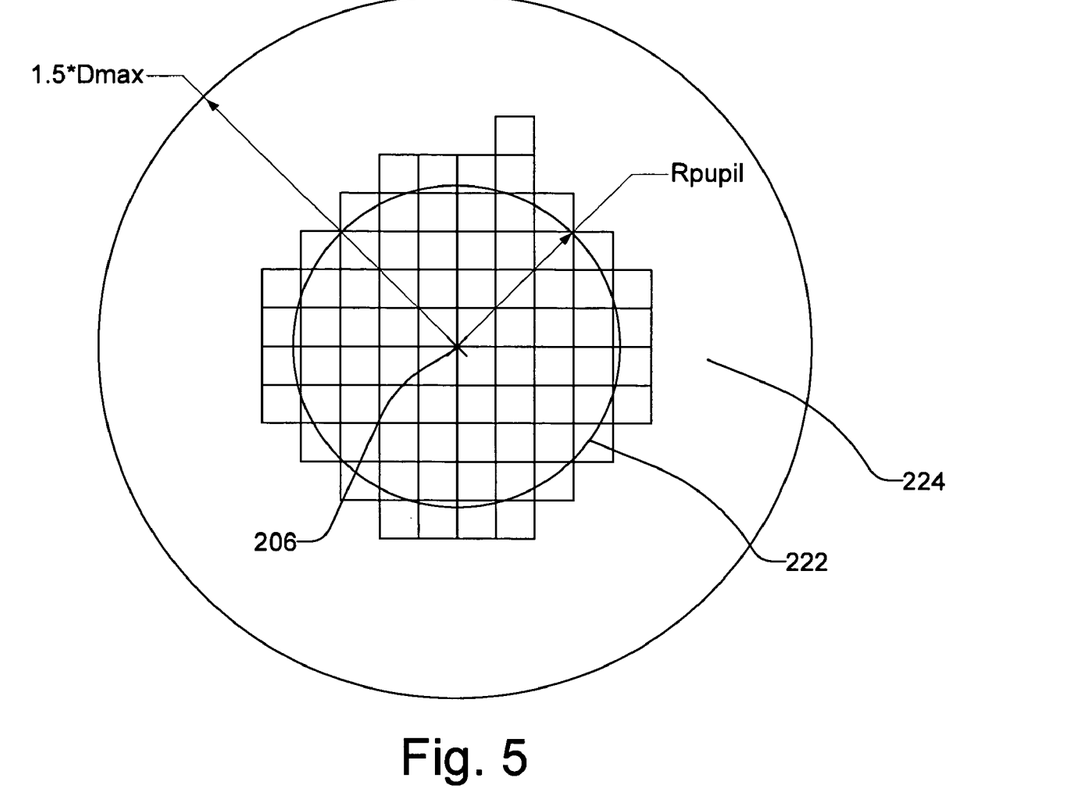

Referring to FIG. 5, the software then determines a first ratio between (1) the number of red eye pixels located within a circle 222 having radius of $R_{pupil}$ and (2) the area of circle 222 in pixels as follows:

$$R_1 = \frac{N_{R_{pupil}}}{A_{R_{pupil}}}, \quad (9)$$

where $R_1$ is the first ratio, $N_{R_{pupil}}$ is the number of red eye pixels within a circle having radius $R_{pupil}$, and $A_{R_{pupil}}$ is the area of the circle.

The software also determines a second ratio between (1) the number of red eye pixels located within a ring 224 having an inner radius of $R_{pupil}$ and an outer radius of $1.5*D_{max}$ and (2) the area of ring 224 in pixels as follows:

$$R_2 = \frac{N_{R_{pupil}/D_{max}}}{A_{R_{pupil}/D_{max}}}, \quad (10)$$

where $R_2$ is the second ratio, $N_{R_{pupil}/D_{max}}$ is the number of red eye pixels within a ring having an inner radius $R_{pupil}$ and an outer radius $1.5*D_{max}$, and $A_{R_{pupil}/D_{max}}$ is the area of the circle in the number of pixels.

The software then determines a difference between the first ratio and the second ratio: $R_1-R_2$. A large difference indicates that red eye region 204 is probably a pupil with red eye. If the difference is less than a threshold, the software then rejects the red eye pixels in red eye region 204 as candidates for red eye removal. In one embodiment, the threshold is 30% (i.e., 0.3).

In step 116, the software determines if each remaining red eye region is too close to another red eye region. In step 118, the software rejects red eye pixels in each red eye region that is too close to another red eye region. Steps 116 and 118 are illustrated in reference to red eye regions 204 and 242 in FIG. 6 but in actually are repeated for each red eye region.

Figure 6:
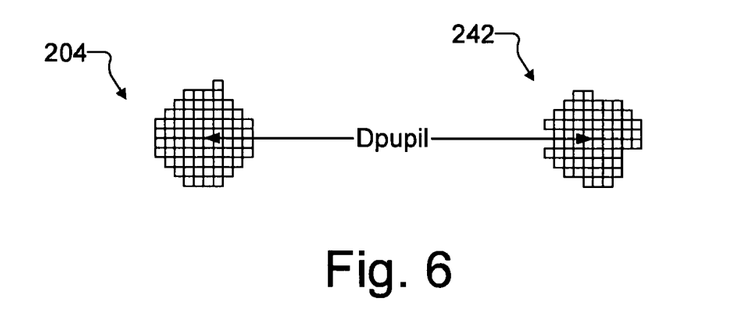
FIG. 6 illustrates how a red eye region is determined to be too close to another red eye region in one embodiment of the invention.

The software determines a distance $D_{pupil}$ between the geometric centers of red eye regions 204 and 242. The software then determines if distance $D_{pupil}$ is within a range that makes red eye regions 204 and 242 too close. In one embodiment, red eye regions are too close if they are within $10*R_{pupil}$ to $14*R_{pupil}$ of each other. The software thus rejects the red eye pixels in red eye region 204 and 242 as candidates for red eye removal if they are too close to each other.

In step 120, the software determines if each remaining red eye region is proximate to a facial region (e.g., face 20 in FIG. 1). In step 122, the software rejects the red eye pixels in each red eye region that is not proximate to a facial region. Steps 120 and 122 are illustrated in reference to red eye region 204 in FIGS. 7 and 8 but in actually are repeated for each red eye region.

Figure 7:
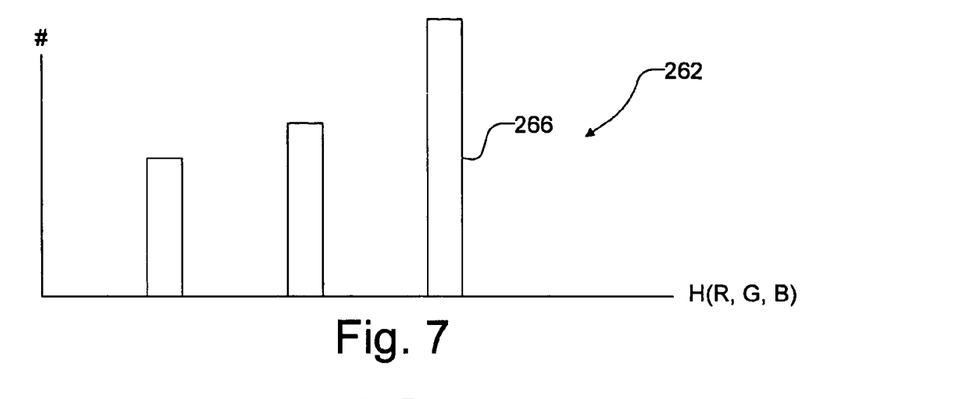
FIGS. 7 and 8 illustrate how a red eye region is determined to be proximate to a facial region in one embodiment of the invention.
Figure 8:
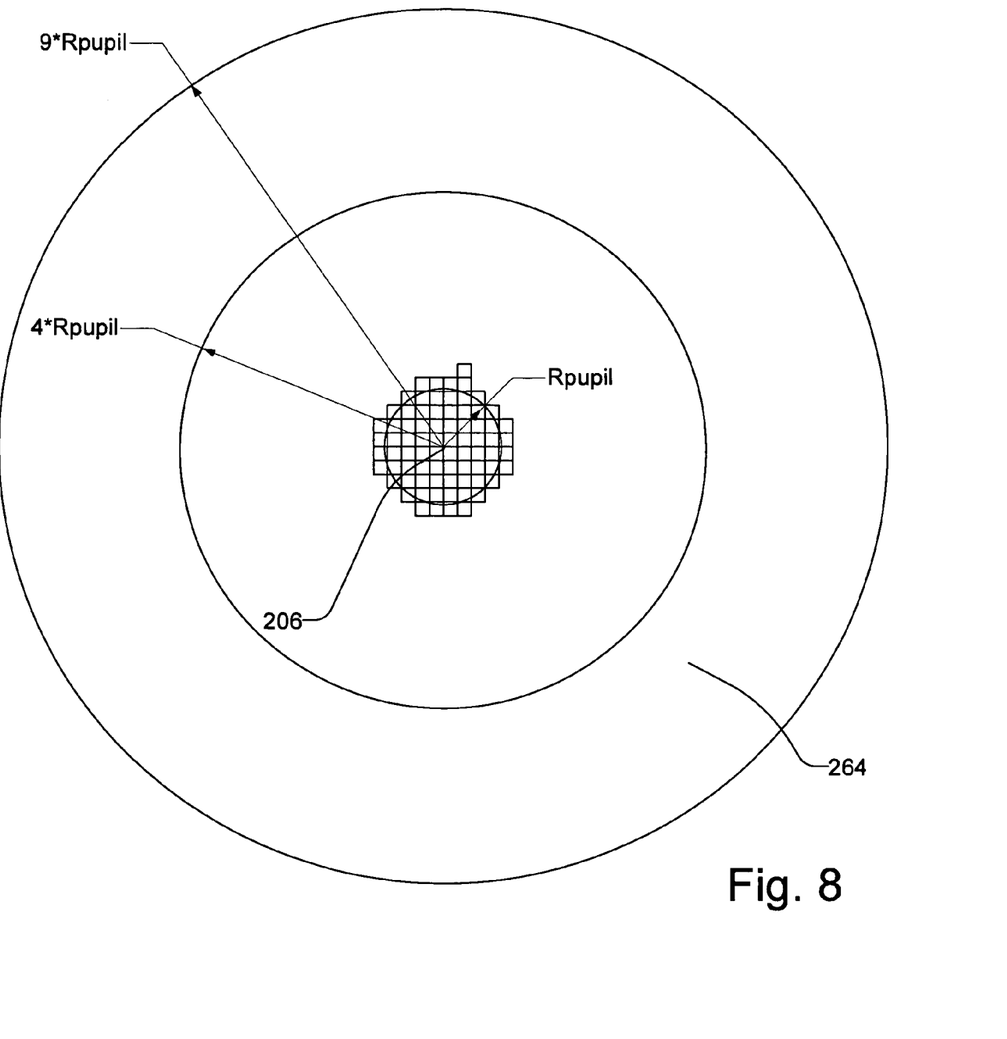

The software first generates a histogram 262 of the pixels located in a ring 264 about geometric center 206. The function of histogram 262 is simply the number of pixels that has a particular color (e.g., a particular combination of Y,Cr,Cb color values). In one embodiment, ring 264 has an inner radius of $4*R_{pupil}$ and an outer radius of $9*R_{pupil}$. The software then selects the most common color 266 in histogram 262 and compares it to a range of threshold skin color values. If color 266 is within the range of threshold skin color values, then red eye region 204 is probably a pupil with red eye that is proximate to a facial region. In one embodiment, the threshold skin color values are expressed in HSV (hue, saturation, value) color space as $-80<H<50$, $5<S<80$, and $20<V<80$. Thus, the software first converts the most common color 266 into HSV color space and then compares it with the threshold skin color values. If color 266 is not within the range of threshold skin color values, the software rejects the pixels in red eye region 204 as candidates for red eye removal. In order to remove the luminance change, the luminance (Y) of the image within the circle having radius $9*R_{pupil}$ will be normalized to before the software generates histogram 262 and compares color 266 to the range of threshold skin color values. This is because without the normalization, any luminance change will introduce a color cast (i.e., unwanted color effect) into the HSV color space.

In step 124, the software determines if each remaining red eye region is proximate to a sclera of an eye (e.g., sclera 18 in FIG. 1). In step 126, the software rejects the red eye pixels in each red eye region that is not proximate to a sclera of an eye. Steps 124 and 126 are illustrated in reference to red eye region 204 in FIGS. 9 and 10 but in actually are repeated for each red eye region.

Figure 9:
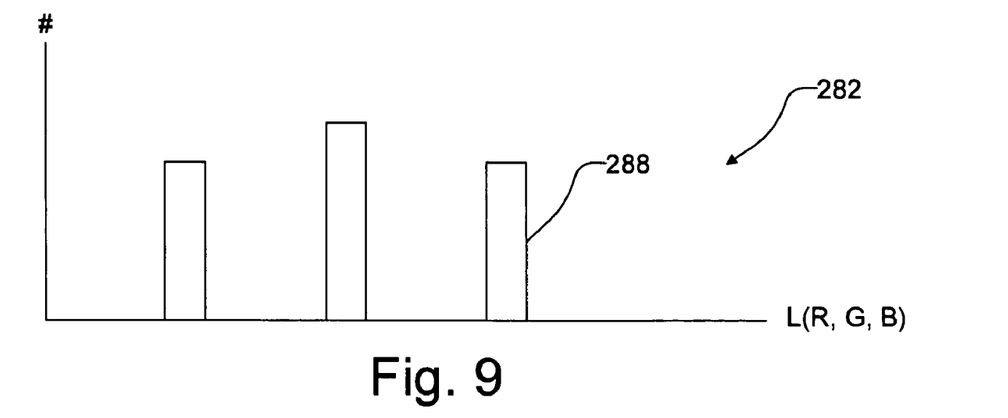
FIGS. 9 and 10 illustrate how a red eye region is determined to be proximate to a white of an eye in one embodiment of the invention.
Figure 10:
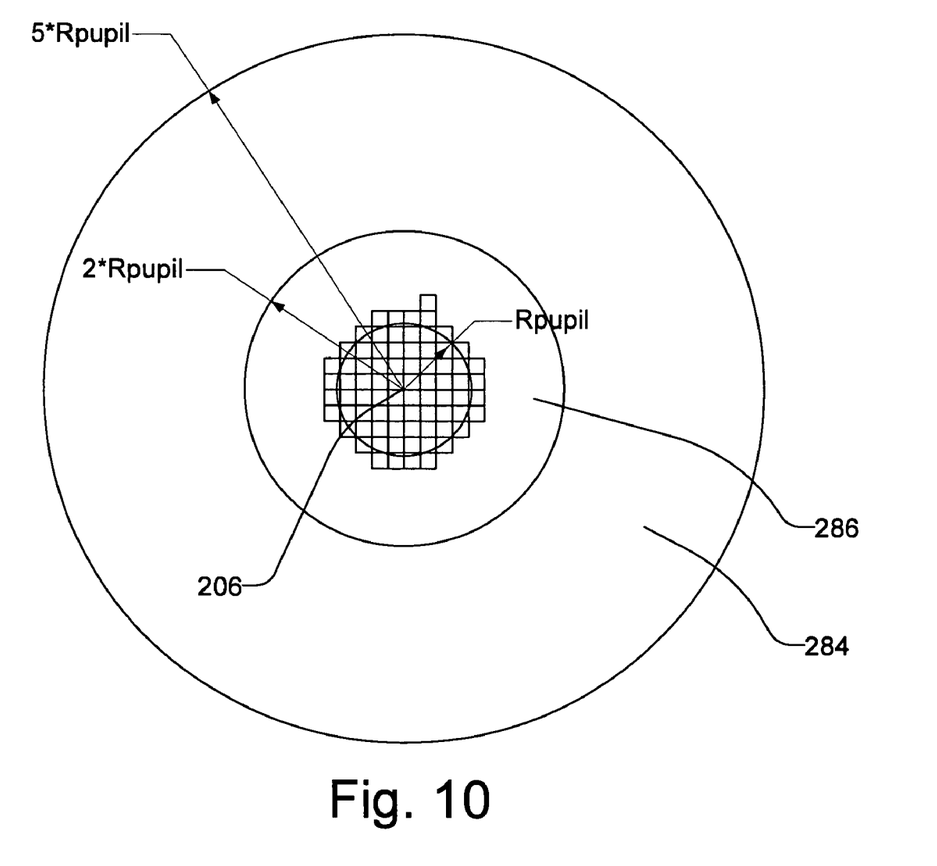

The software generates a luminance histogram 282 of the pixels located in a ring 284 about geometric center 206. In one embodiment, ring 284 has an inner radius of $2*R_{pupil}$ and an outer radius of $5*R_{pupil}$. From histogram 282, the software determines a ratio between (1) the number of pixels having the brightest color 288 in ring 284 and (2) the number of red eye pixels in a circle 286 having a radius of $2*R_{pupil}$ as follows:

$$R_{sclera} = \frac{N_{brightest}}{N_{R_{pupil}}}, \quad (11)$$

where $R_{sclera}$ is the ration, $N_{brightest}$ is the number of pixels having the brightest color in ring 284, and $N_{2*R_{pupil}}$ is the number of red eye pixels within circle 286 having radius of $2*R_{pupil}$.

If the ratio is greater than a sclera threshold, then red eye region 204 is probably a pupil with red eye proximate to the sclera. If the ratio is less than the threshold, then the software rejects the red eye pixels in red eye region 204. In one embodiment, the sclera threshold is 82% (e.g., 0.82).

In step 128, the software replaces the remaining red eye pixels with black pixels to remove the red eye.

The steps in the present invention are different from those in the conventional methods such as Steinberg described above. For example, Steinberg uses the conventional Lab color space but the current invention uses a specific color transform to discriminate the red eye pixels from the other pixels. Steinberg also uses an elongation ratio and a compaction ratio to disqualify candidate regions while the current invention uses round shape detection in terms of a polar coordinate system. Furthermore, the current invention also uses the distance between candidate regions to eliminate erroneous candidates, which is not disclosed by Steinberg.

Various other adaptations and combinations of features of the embodiments disclosed are within the scope of the invention. Numerous embodiments are encompassed by the following claims.

What is claimed is:

1. A non-transitory computer-readable storage medium encoded with executable instructions for execution by a processor to remove a red eye from an image, the instructions comprising:

calculating a weighted red value for each pixel in the image, wherein the weight red value for a pixel is based on (1) red, green, and blue color values of the pixel and (2) a luminance value of the pixel, and the luminance value is a weighted sum of the red, the green, and the blue color values of the pixel;

selecting a plurality of pixels in the image having weighted red values greater than a threshold as red eye pixels; and correcting the red eye pixels to remove the red eye from the image.

2. A non-transitory computer-readable storage medium of claim 1, wherein said calculating a weighted red value comprises:

$$f_1 = \frac{c_1^{(1)}r + c_2^{(1)}g + c_3^{(1)}b}{Y},$$

wherein $f_1$ is the weighted red value, r is the red color value, g is the green color value, b is the blue color value, $c_1^{(1)}$ is a first weight given to the red color value, $c_2^{(1)}$ is a second weight given to the green color value, $c_3^{(1)}$ is a third weight given to the blue color value, and Y is the luminance value.

3. The non-transitory computer-readable storage medium of claim 2, wherein $c_1^{(1)}$ is 0.5, $c_2^{(1)}$ is 0.5, $c_3^{(1)}$ is −1, Y=0.299r+0.587g+0.114b, and the threshold is 0.5.

4. The non-transitory computer-readable storage medium of claim 2, wherein the instructions further comprise, prior to said correcting:

calculating another weighted red value for each pixel in the image, wherein said another weight red value for a pixel is based on (1) red, green, blue color values of the pixel, and (2) a luminance value of the pixel, said calculating another weighted red value comprising:

$$f_2 = \frac{c_1^{(2)}r + c_2^{(2)}g + c_3^{(2)}b}{Y},$$

wherein $f_2$ is said another weighted red value, $c_1^{(2)}$ is another first weight given to the red color value, $c_2^{(2)}$ is another second weight given to the green color value, and $c_3^{(1)}$ is another third weight given to the blue color value; and selecting another plurality of pixels in the image having another weighted red values greater than another threshold as additional red eye pixels.

5. The non-transitory computer-readable storage medium of claim 4, wherein $c_1^{(2)}$ is 0.6667, $c_2^{(2)}$ is 0.3333, $c_3^{(2)}$ is −1.0, Y=0.299r+0.587g+0.114b, and the threshold is 0.5.

6. The non-transitory computer-readable storage medium of claim 1, wherein the instructions further comprise, prior to said correcting:

grouping a plurality of red eye pixels that are contiguous into a red eye region;

determining if the red eye region comprises a substantially round pupil; and rejecting the plurality of red eye pixels when the red eye region does not comprise a substantially round pupil.

7. The non-transitory computer-readable storage medium of claim 6, wherein said determining if the red eye region comprises a substantially round pupil comprises:

determining a geometric center of the red eye region;

for each radius in a range of radii, determining a difference between (1) weighted red values of red eye pixels located at a radius and at a range of angles about the geometric center and (2) weighted red values of red eye pixels located at a next radius in the range of radii and at the range of angles;

selecting one radius in the range of radii that provides a largest difference as a pupil radius for the red eye region;

determining a first ratio of(1) a first number of red eye pixels located in a circle having the pupil radius to (2) an area of the circle;

determining a second ratio of (1) a second number of red eye pixels in a ring having an inner radius of the pupil radius and an outer radius of a maximum radius in the range of radii to (2) an area of the ring; and determining a difference between the first ratio and the second ratio, wherein the red eye region does not comprise a substantially round pupil when the difference is less than another threshold.

8. The non-transitory computer-readable storage medium of claim 7, wherein the range of radii ranges from 0.5 to 1.5 times a distance from the geometric center to a farthest red eye pixel in the red eye region.

9. The non-transitory computer-readable storage medium of claim 6, wherein the instructions further comprise:

determining if the red eye region is too close to another red eye region formed by grouping another plurality of red eye pixels that are contiguous; and rejecting the plurality of red eye pixels when the red eye region is too close to said another red eye region.

10. The non-transitory computer-readable storage medium of claim 9, wherein said determining if the red eye region is too close to another red eye region comprises:

determining if a geometric center of the red eye region is within a range of distances of another geometric center of said another red eye region, wherein the range of distances is proportional to a pupil radius of the red eye region.

11. The non-transitory computer-readable storage medium of claim 10, wherein the instructions further comprise determining the pupil radius as follows:

determining the geometric center of the red eye region;

for each radius in a range of radii, determining a difference between (1) weighted red values of red eye pixels located at a radius and at a range of angles about the geometric center and (2) weighted red values of red eye pixels located at a next radius in the range of radii and at the range of angles; and selecting one radius in the range of radii that provides a largest difference as the pupil radius for the red eye region.

12. The non-transitory computer-readable storage medium of claim 11, wherein the range of distances comprises 10 to 14 times the pupil radius.

13. The non-transitory computer-readable storage medium of claim 9, wherein the instructions further comprise:

determining if the red eye region is proximate to a facial region; and rejecting the plurality of red eye pixels when the red eye region is not proximate to a facial region.

14. The non-transitory computer-readable storage medium of claim 13, wherein said determining if the red eye region is proximate to a facial region comprises:

generating a histogram for pixels in a ring having inner and outer radii proportional to a pupil radius of the red eye region;

selecting a most common color in the histogram;

comparing the most common color to a range of threshold skin colors; and rejecting the plurality of red eye pixels when the most common color in the histogram is not within the range of the threshold skin colors.

15. The non-transitory computer-readable storage medium of claim 14, wherein said comparing comprises comparing the most common color in HSV color space to the range of threshold skin colors in HSV color space.

16. The non-transitory computer-readable storage medium of claim 14, wherein the instructions further comprise determining the pupil radius as follows:
   determining a geometric center of the red eye region;
   for each radius in a range of radii, determining a difference between (1) weighted red values of red eye pixels located at a radius and at a range of angles about the geometric center and (2) weighted red values of red eye pixels located at a next radius in the range of radii and at the range of angles; and
   selecting one radius in the range of radii that provides a largest difference as the pupil radius for the red eye region.

17. The non-transitory computer-readable storage medium of claim 16, wherein the inner and the outer radii comprises of 4 to 9 times the pupil radius.

18. The non-transitory computer-readable storage medium of claim 13, wherein the instructions further comprise:
   determining if the red eye region is proximate to a sclera; and
   rejecting the plurality of red eye pixels when the red eye region is not proximate to a sclera.

19. The non-transitory computer-readable storage medium of claim 18, wherein said determining if the red eye region is proximate to a sclera comprises:
   generating a luminance histogram for pixels in a ring having inner and outer radii proportional to a pupil radius of the red eye region;
   selecting a brightest color in the luminance histogram;
   determine a ratio between a number of pixels in the ring having the brightest color to a number of red eye pixels within a circle having the pupil radius; and
   rejecting the plurality of red eye pixels when the ratio is less than another threshold.

20. The non-transitory computer-readable storage medium of claim 19, wherein the instructions further comprise determining the pupil radius as follows:
   determining a geometric center of the red eye region;
   for each radius in a range of radii, determining a difference between 1) weighted red values of red eye pixels located at a radius and at a range of angles about the geometric center and (2) weighted red values of red eye pixels located at a next radius in the range of radii and at the range of angles; and
   selecting one radius in the range of radii that provides a largest difference as the pupil radius for the red eye region.

21. The non-transitory computer-readable storage medium of claim 20, wherein the inner and the outer radii comprises 2 to 5 times the pupil radius.

22. A non-transitory computer-readable storage medium encoded with executable instructions for execution by a processor to remove a red eye from an image, the instructions comprising:
   calculating a weighted red value for each pixel in the image from a luminance, a red chrominance, and a blue chrominance values of the pixel in the image, comprising:

$$f_1 = \frac{1.41514(Cr - 128) + 1.23014(Cb - 128)}{Y},$$

wherein $f_1$ is the weighted red value, Cr is the red chrominance value, Cb is the blue chrominance value, and Y is the luminance value;
   selecting a plurality of pixels in the image having weighted red values greater than a threshold as red eye pixels; and
   correcting the red eye pixels in the image.

23. The non-transitory computer-readable storage medium of claim 22, wherein the instructions further comprise, prior to said correcting:
   calculating another weighted red value for each pixel in the image from the luminance, the red chrominance, and the blue chrominance values of each pixel in the image, comprising:

$$f_2 = \frac{0.69662(Cr - 128) - 1.88671(Cb - 128)}{Y},$$

wherein $f_2$ is said another weighted red value; and
   selecting another plurality of pixels in the image having another weighted red values greater than another threshold as additional red eye pixels.

24. A method for removing a red eye from an image, comprising:
   calculating, using a programmed processor, a weighted red value for each pixel in the image, wherein the weight red value for a pixel is based on (1) red, green, and blue color values of the pixel and (2) a luminance value of the pixel, and the luminance value is a weighted sum of the red, the green, and the blue color values of the pixel;
   selecting, using the programmed processor, a plurality of pixels in the image having weighted red values greater than a threshold as red eye pixels; and
   correcting, using the programmed processor, the red eye pixels to remove the red eye from the image.

25. The method of claim 24, wherein said calculating a weighted red value comprises:

$$f_1 = \frac{c_1^{(1)}r + c_2^{(1)}g + c_3^{(1)}b}{Y},$$

wherein $f_1$ is the weighted red value, r is the red color value, g is the green color value, b is the blue color value, $c_1^{(1)}$ is a first weight given to the red color value, $c_2^{(1)}$ is a second weight given to the green color value, $c_3^{(1)}$ is a third weight given to the blue color value, and Y is the luminance value.

26. The method of claim 25, wherein $c_1^{(1)}$ is 0.5, $c_2^{(1)}$ is 0.5, $c_2^{(1)}$ is −1, Y=0.299r+0.587g+0.114b , and the threshold is 0.5.

27. The method of claim 25, further comprising, prior to said correcting:
   calculating another weighted red value for each pixel in the image, wherein said another weight red value for a pixel is based on (1) red, green, blue color values of the pixel, and (2) the a luminance value of the pixel, said calculating another weighted red value comprising:

$$f_2 = \frac{c_1^{(2)}r + c_2^{(2)}g + c_3^{(2)}b}{Y},$$

wherein $f_2$ is said another weighted red value, $c_1^{(2)}$ is another first weight given to the red color value, $c_2^{(2)}$ is another second weight given to the green color value, and $c_3^{(2)}$ is another third weight given to the blue color value; and     selecting another plurality of pixels in the image having another weighted red values greater than another threshold as additional red eye pixels.

28. The method of claim 27, wherein $c_1^{(2)}$ is 0.6667, $c_2^{(2)}$ is 0.3333, $c_3^{(2)}$ is −1.0, Y=0.299r+0.587g+0.114b, and the threshold is 0.5.

29. The method of claim 24, further comprising, prior to said correcting:

grouping a plurality of red eye pixels that are contiguous into a red eye region;

determining if the red eye region comprises a substantially round pupil; and     rejecting the plurality of red eye pixels when the red eye region does not comprise a substantially round pupil.

30. The method of claim 29, wherein said determining if the red eye region comprises a substantially round pupil comprises:

determining a geometric center of the red eye region;

for each radius in a range of radii, determining a difference between (1) weighted red values of red eye pixels located at a radius and at a range of angles about the geometric center and (2) weighted red values of red eye pixels located at a next radius in the range of radii and at the range of angles;

selecting one radius in the range of radii that provides a largest difference as a pupil radius for the red eye region;

determining a first ratio of (1) a first number of red eye pixels located in a circle having the pupil radius to (2) an area of the circle;

determining a second ratio of (1) a second number of red eye pixels in a ring having an inner radius of the pupil radius and an outer radius of a maximum radius in the range of radii to (2) an area of the ring; and     determining a difference between the first ratio and the second ratio, wherein the red eye region does not comprise a substantially round pupil when the difference is less than another threshold.

31. The method of claim 30, wherein the range of radii ranges from 0.5 to 1.5 times a distance from the geometric center to a farthest red eye pixel in the red eye region.

32. The method of claim 29, further comprising:

determining if the red eye region is too close to another red eye region formed by grouping another plurality of red eye pixels that are contiguous; and     rejecting the plurality of red eye pixels when the red eye region is too close to said another red eye region.

33. The method of claim 32, wherein said determining if the red eye region is too close to another red eye region comprises:

determining if a geometric center of the red eye region is within a range of distances of another geometric center of said another red eye region, wherein the range of distances is proportional to a pupil radius of the red eye region.

34. The method of claim 33, further comprising determining the pupil radius as follows:

determining the geometric center of the red eye region;

for each radius in a range of radii, determining a difference between (1) weighted red values of red eye pixels located at a radius and at a range of angles about the geometric center and (2) weighted red values of red eye pixels located at a next radius in the range of radii and at the range of angles; and     selecting one radius in the range of radii that provides a largest difference as the pupil radius for the red eye region.

35. The method of claim 34, wherein the range of distances comprises 10 to 14 times the pupil radius.

36. The method of claim 32, further comprising:

determining if the red eye region is proximate to a facial region; and     rejecting the plurality of red eye pixels when the red eye region is not proximate to a facial region.

37. The method of claim 36, wherein said determining if the red eye region is proximate to a facial region comprises:

generating a histogram for pixels in a ring having inner and outer radii proportional to a pupil radius of the red eye region;

selecting a most common color in the histogram;

comparing the most common color to a range of threshold skin colors; and     rejecting the plurality of red eye pixels when the most common color in the histogram is not within the range of the threshold skin colors.

38. The method of claim 37, wherein said comparing comprises comparing the most common color in HSV color space to the range of threshold skin colors in HSV color space.

39. The method of claim 37, further comprising determining the pupil radius as follows:

determining a geometric center of the red eye region;

for each radius in a range of radii, determining a difference between (1) weighted red values of red eye pixels located at a radius and at a range of angles about the geometric center and (2) weighted red values of red eye pixels located at a next radius in the range of radii and at the range of angles; and     selecting one radius in the range of radii that provides a largest difference as the pupil radius for the red eye region.

40. The method of claim 39, wherein the inner and the outer radii comprises of 4 to 9 times the pupil radius.

41. The method of claim 36, further comprising:

determining if the red eye region is proximate to a sclera; and     rejecting the plurality of red eye pixels when the red eye region is not proximate to a sclera.

42. The method of claim 41, wherein said determining if the red eye region is proximate to a sclera comprises:

generating a luminance histogram for pixels in a ring having inner and outer radii proportional to a pupil radius of the red eye region;

selecting a brightest color in the luminance histogram;

determine a ratio between a number of pixels in the ring having the brightest color to a number of red eye pixels within a circle having the pupil radius; and     rejecting the plurality of red eye pixels when the ratio is less than another threshold.

43. The method of claim 42, further comprising determining the pupil radius as follows:

determining a geometric center of the red eye region;

for each radius in a range of radii, determining a difference between (1) weighted red values of red eye pixels located at a radius and at a range of angles about the geometric center and (2) weighted red values of red eye pixels located at a next radius in the range of radii and at the range of angles; and selecting one radius in the range of radii that provides a largest difference as the pupil radius for the red eye region.

44. The method of claim 43, wherein the inner and the outer radii comprises 2 to 5 times the pupil radius.

45. A method for removing a red eye from an image, comprising:

calculating, using a programmed processor, a weighted red value for each pixel in the image from a luminance, a red chrominance, and a blue chrominance values of the pixel in the image, comprising:

$$f_1 = \frac{1.41514(Cr - 128) + 1.23014(Cb - 128)}{Y},$$

wherein $f_1$ is the weighted red value, Cr is the red chrominance value, Cb is the blue chrominance value, and Y is the luminance value;

selecting, using the programmed processor, a plurality of pixels in the image having weighted red values greater than a threshold as red eye pixels; and correcting, using the programmed processor, the red eye pixels in the image.

46. The method of claim 45, further comprising, prior to said correcting:

calculating another weighted red value for each pixel in the image from the luminance, the red chrominance, and the blue chrominance values of each pixel in the image, comprising:

$$f_2 = \frac{0.69662(Cr - 128) - 1.88671(Cb - 128)}{Y},$$

wherein $f_2$ is said another weighted red value; and selecting another plurality of pixels in the image having another weighted red values greater than another threshold as additional red eye pixels.

\* \* \* \* \*